D. ZUERN.
Hydrant-Valve.
No. 199,890. Patented Jan. 29, 1878.
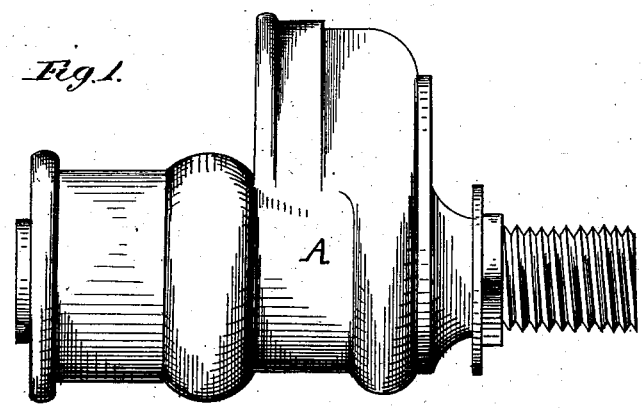
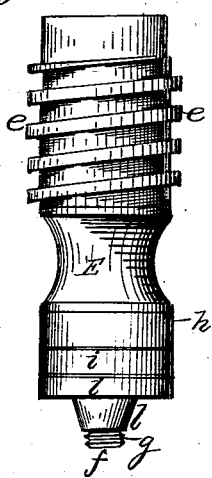
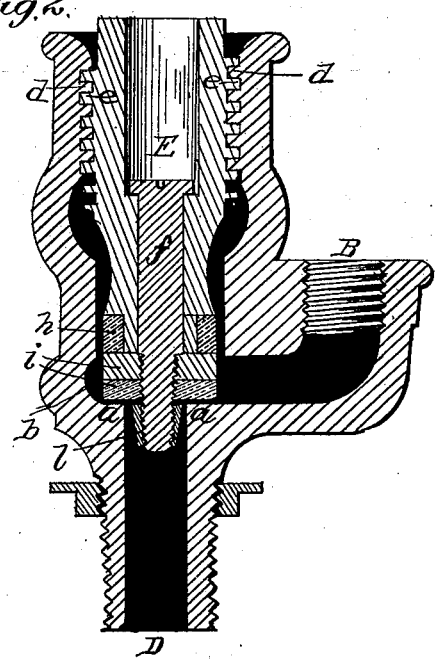

UNITED STATES PATENT OFFICE.

DANIEL ZUERN, OF SHAMOKIN, PENNSYLVANIA, ASSIGNOR OF ONE-HALF HIS RIGHT TO HEZEKIAH FLOYD, OF SAME PLACE.

IMPROVEMENT IN HYDRANT-VALVES.

Specification forming part of Letters Patent No. 199,890, dated January 29, 1878; application filed November 15, 1877.

*To all whom it may concern:*

Be it known that I, DANIEL ZUERN, of Shamokin, in the county of Northumberland and State of Pennsylvania, have invented a new and useful Improvement in Hydrant-Valves, of which the following is a specification, reference being had to the accompanying drawings.

The invention relates to an improvement in hydrant-valves; and consists in the devices hereinafter specifically described.

The object of the invention is to provide a suitable valve for hydrants and analogous purposes.

In the accompanying drawings, Figure 1 is a plan view of a device embodying the elements of the invention. Fig. 2 is a central vertical longitudinal section of same. Fig. 3 is a plan view of the screw E.

In the accompanying drawings, A represents the casing of the valve, provided on its side with the threaded aperture B, and at its lower portion with the aperture D, in which is secured a suitable pipe (not shown) for conveying the water from the main (not shown) to the valve.

At the upper end of the pipe D, within the casing A, and opposite the aperture B, is supplied the valve-seat $a$, around which the casing is enlarged, as shown at $b$, and above this the walls of same are vertical and smooth, until within a suitable distance from the top of the device, where the said walls are internally threaded, as shown, the thread (lettered $d$) extending upward as far as may be found convenient—to the upper edge of the casing A, if desired.

Within the casing A is placed the hollow screw E, the threads $e$ of which mesh with the threads $d$. Thus it is obvious that the screw may be retained in the casing, and at the same time be capable of vertical adjustment.

The upper interior portion of the screw E is in the contour of a square, while the lower portion is of lesser diameter, and is rounded, so as to closely envelop the pin $f$, the lower end whereof projects below the seat $a$, and is supplied with threads $g$, the upper end of the pin being furnished with a suitable head for retaining it in position.

The lower edge of the screw E is recessed, and a washer, $h$, of rubber or other suitable material, inserted in lieu of the removed portion.

Upon the lower or threaded end of the pin $f$ are supplied a suitable number of washers, $i$, which are in circumference equal to the washer $h$, and are secured on the pin by the cap $l$.

It is preferred to employ, besides the washer $h$, a metallic washer, and one having suction; but it is evident that more than these could be used, if desired.

The washers $i$, when in position, are brought firmly against the washer $h$, so as to exclude the entrance of water.

The screw E, with pin $f$ and washers $h$ $i$ attached, is inserted in the casing A, with the lower washer, $i$, resting upon the seat $a$, and may be retained therein, and at the same time be capable of vertical adjustment, by means of the screw-threads $d$ $e$.

To the upper end of the screw E may be attached a suitable pump-rod, (not shown,) and in the efflux-aperture B a pipe (not shown) for conveying the water off may be secured.

It is manifest that when the screw E is turned to the right the washer $i$ is raised from the seat $a$, and that when the movement of the screw is reversed, the washer is again pressed against the seat $a$. Thus the valve may be either opened or closed, and the water consequently either permitted to flow or be checked.

In the operation of the device the water enters the casing A by means of pipe D, and escapes through the aperture B.

It is evident that the screw E and pin $f$ can be withdrawn, repaired, and reinserted without removing the casing A.

What I claim as my invention, and desire to secure by Letters Patent, is—

1. The casing A, provided with apertures B and D, in combination with the screw E and pin $f$, with its washers, substantially as set forth.

2. In a hydrant-valve, the casing A, having seat $a$, in combination with the screw E and pin $f$, having washers $i$, substantially as specified.

3. In a hydrant-valve, the screw E, having threads $e$ and washer $h$, in combination with the seat $a$, and with the pin $f$, having washers $i$, substantially as specified.

In testimony that I claim the foregoing improvement in hydrant-valves, as above described, I have hereunto set my hand.

DANIEL ZUERN.

Witnesses:
  JOS. SCOTT,
  VALENTIN FAGELY.